Patented Dec. 28, 1943

2,337,563

UNITED STATES PATENT OFFICE 2,337,563

HYDROXY STEROIDS AND METHOD OF OBTAINING SAME

Russell Earl Marker, State College, Pa., assignor to Parke, Davis & Company, Detroit, Mich., a corporation of Michigan No Drawing. Application September 30, 1940, Serial No. 359,161

6 Claims. (Cl. 260—397.1)

This invention relates to the production of steroidal compounds of value in themselves as therapeutic agents, or as intermediates for the preparation of therapeutically active substances. More particularly, this invention relates to the preparation of a new group of C-17 side chain shortened steroids having the general formula

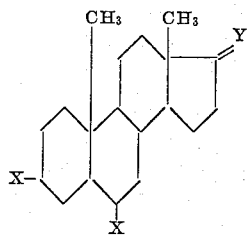

where Y is one of the class

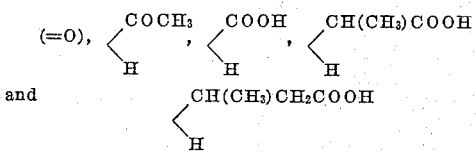

and groups hydrolyzable to give these, and X is one of the class: (a) hydroxyl, and (b) ether and ester groups hydrolyzable to hydroxyl.

This general formula includes certain groups of substances made especially readily available by the present invention, and these new substances are representable by the formulae

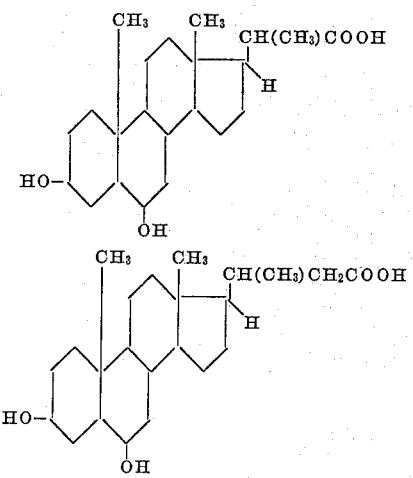

It is known that some steroidal compounds having a carbonyl-substituted side chain attached to the number 17 carbon atom of the steroid nucleus can be degraded or converted into acids or ketones of lesser carbon content by methods involving production of ethylenic derivatives which are then oxidized at the carbon-carbon double bond in the side chain. However, this degradation has previously been carried out on steroids having more than one hydroxyl or equivalent groups attached to the carbocyclic ring system only in those instances where the hydroxyl or equivalent groups are sufficiently removed from one another so that they are not affected as, for example, in 3,7,12-trihydroxy steroids. On the other hand, greater proximity of the hydroxyl groups in a 3,6-dihydroxy steroid introduces complications in the oxidative degradation of the side chain. Thus, Windaus and Hossfeld, [Z. physiol. Chem. 145, 177 et seq. (1925)] showed that the oxidaiton of cholestane-3,6-diol with chromic acid, even while protecting the hydroxyl groups by acetylation, resulted in breaking open the ring system at the acetate groups.

Also, in obtaining the ethylenic compounds to be oxidized, as mentioned above, the proximity of the 3-hydroxyl and the 6-hydroxyl groups introduces the complication that there is a danger of too extensive dehydration which would involve the groups at the number 5 and number 6 carbon atoms when using an organomagnesium compound or carbinol dehydrating agent, such as acetic anhydride.

Contrary to the indications from the prior art, it has now been found that the side chain of steroids of the general formula—

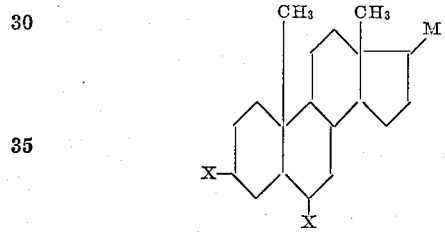

where M is a carbonyl-group-containing-side chain such as —COOH, —COCH₃,

CH(CH₃) CH₂CH₂CH₂COCH₃, or —CH(CH₃)(CH₂)$_n$COOH, $n$ being a small integer and X is selected from the class consisting of: (a) hydroxyl, and (b) ether and ester groups hydrolyzable to hydroxyl, such groups including, besides —OH, —O acyl, —O alkyl, —O aryl, O aralkyl, —O carbamate, —OSO₃H, and the like, can be subjected to side chain degradation or shortening, to obtain compounds of the general formula first given above without affecting the substituents in the ring system.

In carrying out this invention a 3,6-dihydroxy steroid or equivalent acylated or etherified derivative having at C-17 a side chain carrying a carbonyl group is reacted with an excess of an organmetallic compound to form a tertiary carbinol.

I prefer to use, for this purpose, an organometallic compound derived from an aryl- or methyl halide or other organic halide of the structure

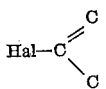

i. e., one yielding a tertiary carbinol which will dehydrate only in the desired manner. Aliphatic halide having the structure

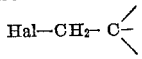

or

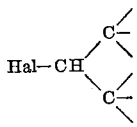

offer the alternative mode of dehydration from the carbon atom originally a carbonyl group to the carbon atom derived from the halide and hence may not give as good yields of the desired product.

If the starting material is an acid or an amide it is desirable to convert it to the corresponding ester prior to treatment with the organometallic compound.

The carbinol obtained from the organometallic addition complex is dehydrated by heat and/or acidic reagents and the hydroxyl groups at $C_3$ and $C_6$ transformed by treatment with a reagent which protects the hydroxyl groups against oxidation and yet yields transformation products hydrolyzable to give hydroxyl groups. The resulting hydroxyl-protected ethylene derivative is oxidized under relatively mild conditions, as for example, at temperatures not greatly exceeding 100° C. and for periods of time insufficient to cause oxidation of the rings A—B. As thus conducted, the oxidation takes place almost entirely at the double bond, i. e., between the carbon atom which was the original carbonyl carbon atom of the starting material and the adjacent carbon atom nearer $C_{17}$. After hydrolysis the product, a 3,6-dihydroxy-steroidal acid or ketone with a shortened substituent at $C_{17}$ is isolated.

The invention may be illustrated by the following examples:

Example 1

(a) Hyodesoxycholic acid, M. P. 196° C. is esterified by refluxing with a 1 per cent solution of hydrogen chloride in methanol (absolute). The solvent is removed and the residual oil is crystallized from benzene. It melts at 83–86° C.

(b) To the Grignard reagent prepared by adding 730 g. of bromobenzene in 1600 cc. of dry ether to 110 g. of magnesium under 800 cc. of dry ether is added the methyl ester of hyodesoxycholic acid (from 100 g. of hyodesoxycholic acid) in benzene (dry). The mixture is refluxed for three hours, then most of the solvent is distilled off and is replaced with dry benzene. The benzene suspension of white crystalline Grignard complex is refluxed overnight, and then poured on 4 kilos of crushed ice and 300 cc. of hydrochloric acid. The mixture is extracted with ether and the ethereal extract washed with dilute hydrochloric acid, then with dilute potassium hydroxide, and finally with water. Evaporation of the solvents leaves a yellow crystalline residue which is refluxed 1.5 hours with 300 cc. of acetic anhydride. After removal of the excess acetic anhydride in vacuo, the residue is refluxed with 1 liter of acetic acid in order to dehydrate the diphenyl carbinol to the ethylenic compound. This unsaturated derivative is oxidized in 125 cc. of chloroform and 750 cc. of glacial acetic acid in 30 minutes at 15° C. by adding slowly a solution of 94 g. of chromic acid in 75 cc. of water and 175 cc. of glacial acetic acid.

The oxidized mixture is saturated with sulfur dioxide while cooled in an ice bath. Approximately a liter of water is added and the solution partly evaporated in vacuo. It is extracted into ether and the ether well washed with water. The washings are extracted with ether and this ethereal extract is again washed with water. The ethereal extracts are combined and extracted wtih 2.5 liters of 2 N potassium hydroxide. The yellow solution is refluxed 1.5 hours and then poured into water containing 300 cc. of hydrochloric acid. The product is filtered, dried and recrystallized from ethyl acetate, giving 55 g. of nor-hyodesoxycholic acid, M. P. 196–198° C.

Example 2

When methyl $3(\beta)$, 6-dihydroxy-allo-cholanate, M. P. 181° C., prepared by the catalytic hydrogenation of methyl $\beta$-dehydrohyodesoxycholate, is treated as described above, there is obtained $3(\beta)$, 6-dihydroxy-nor-allo-cholanic acid of M. P. 225° C.

Example 3

(a) The methyl ester of nor-hyodesoxycholic acid is prepared by refluxing 42 g. of the acid with 1 liter of 1 per cent methanolic hydrogen chloride. The methanol is completely evaporated and the residue crystallized from benzene. The ester, methyl nor-hyodesoxycholate, melts at 93–95° C. It crystallizes with one mole of benzene of crystallization.

(b) The methyl ester obtained from 40 g. of nor-hyodesoxycholic acid is added in benzene to 16 mols of phenyllithium prepared according to Gilman, Zoellner and Selby, J. Am. Chem. Soc., 54, 1957 (1932). The mixture is then heated overnight on a steam bath, and then hydrolyzed and dehydrated as described for the analogous preparation in Example 1. The diphenyl ethylene thus obtained is not crystallized. Instead, the total product is dissolved in 55 cc. of chloroform and 325 cc. of acetic acid, and in 30 minutes at 15° C., 40 g. of chromic oxide in 30 cc. of water and 75 cc. of acetic acid is added. Sulfur dioxide is then passed into the solution to destroy the excess chromic oxide. The bis-nor acid is isolated as described for the nor-acid (Example 1). By adding the potassium salt of the acid slowly to a mechanically stirred mixture of ice water and hydrochloric acid the bis-nor acid separates as a flocculent precipitate which is easily filtered and dried. This acid, bis-nor hyodesoxycholic acid, crystallizes from a large volume of ethyl acetate as white crystals, M. P. 240° C. Yield 17 g.

$2(\beta)$, 6-dihydroxy-nor-allo-cholanic acid, M. P. 225° C., may be degraded in a similar manner to give $3(\beta)$, 6-dihydroxy-bis-nor-allo-cholanic acid as white needles, M. P. 259° C. This acid forms a methyl ester of M. P. 233° C., a diacetate of M. P. 115° C., and a methyl ester diacetate of M. P. 135° C.

Example 4

(a) Methylation of bis-nor-hyodesoxycholic acid in methanolic hydrogen chloride yields an unsharply melting (120–127°) substance. However, methylation with excess diazo-methane in ether alcohol solution furnished a quantitative yield of the methyl ester of bis-nor-hyodesoxycholic acid of M. P. 146° C. (sintering slightly at 93° C.).

(b) Fifteen grams of the methyl ester, M. P. 146° C., of bis-nor-hyodesoxycholic acid is added in benzene solution to 16 mols of phenylmagnesium bromide. The reaction is carried out in the same way as that described for the preparation of nor-hyodesoxycholic acid (Example 1). The carbinol is acetylated with acetic anhydride and pyridine at 100° C. for twenty hours. The solvents are evaporated in vacuo and the residue taken into ether. The ethereal solution is washed with dilute hydrochloric acid and with sodium carbonate solution and then evaporated to dryness. The residue is dehydrated by refluxing it for six hours with acetic acid. The solvent is evaporated in vacuo. The crude ethylenic compound is treated in chloroform solution at 0° C., with the theoretical amount of ozone.

The ozonide is decomposed by adding 100 cc. of acetic acid and 70 g. of zinc dust and allowing it to stand for a day. Then the mixture is filtered, and the filtrate washed with water and dilute sodium bicarbonate solution. The chloroform is removed in vacuo, and the residue treated in the known manner with trimethylaminoacetohydrazide chloride. The ketonic fraction is crystallized from dilute alcohol and yields crystals of pregnanediol-3(α), 6-one-20 diacetate, M. P. 100° C. On hydrolysis with alcoholic potassium hydroxide, it gives pregnanediol-3(α), 6-one-20. The acetate of this example may be represented by the formula

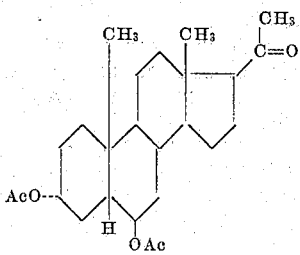

*Example 5*

Two grams of methyl bis-nor-hyodesoxycholate, M. P. 146° C., prepared as in Example 4, in benzene solution are treated with phenylmagnesium bromide, and the triol so formed acetylated and dehydrated as described for Examples 1, 2 and 3. To the product, in 100 cc. of acetic acid, is added, slowly, at 80° C. a solution of 13 g. of chromic anhydride in 40 cc. of 65% acetic acid over a period of three hours. The excess chromic anhydride is then destroyed by adding 20 cc. of methanol, and the solution diluted with water and ether-extracted. The ethereal layer is washed well with water, and then extracted with sodium hydroxide solution. The alkaline extract is refluxed for two hours, cooled, acidified, and extracted with ether. Evaporation of the ether gives the crystalline etio-hyodesoxycholic acid which is recrystallized from ether. It melts at 255° C. Its methyl ester may readily be prepared by the action of an ethereal solution of diazomethane on the acid in the known manner.

*Example 6*

Three grams of pregnane-diol-3,6-one-20-diacetate, obtained for instance as described in Example 4, is dissolved in benzene and run into a solution of methylmagnesium iodide prepared from 40 g. of methyl iodide. After refluxing for several hours, the reaction mixture is evaporated to a small volume, dry benzene added, and the mixture refluxed overnight. The reaction mixture is hydrolyzed, ether extracted, and the ether removed on a steam bath. The residue is refluxed with 20 cc. of acetic anhydride for thirty minutes, 50 cc. of acetic acid and 10 cc. of water added, and the solution refluxed for six hours more. The solvent is completely removed in vacuo, and the residue dissolved in chloroform. A slow stream of ozone is passed into the solution at 0° C. for a half hour, and then 5 cc. of acetic acid and 4 g. of zinc are added and the mixture set aside at room temperature. The next day the mixture is filtered, washed with water and dilute alkali, and the chloroform removed. The residue is hydrolyzed with alkali and then separated from some impurities by treatment in the usual way with trimethylaminoacetohydrazide chloride. The ketone, etiocholanediol-3,6-one-17 so obtained is further crystallized from dilute alcohol, and is thus obtained in a white, crystalline form. It has the formula

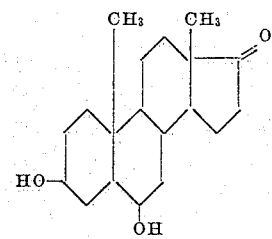

*Example 7*

When the methyl ester of etio-hyodesoxycholic acid is treated as described for pregnane-diol-3,6 in Example 6, the same product, etio-cholane-diol-3,6-one-17, is obtained.

*Example 8*

(a) To a solution of 25 g. 6-ketocholestanol-3(β), M. P. 143° C., in 300 cc. of methanol is added 1.0 g. of platinum oxide catalyst, and the mixture shaken under 3 atmospheres of hydrogen for forty-five minutes during which the diol partially separates out of solution. The mixture of catalyst and precipitated diol is collected on a Buchner funnel, and the diol leached out with warm alcohol and added to the filtrate. This combined alcoholic solution is concentrated, and on cooling, deposits a crop of crystals, which after recrystallization weigh 20 g. and have M. P. 190° C. This cholestanediol-3,6, hitherto unknown, depresses the melting point of the cholestanediol-3,6, M. P. 216° C., of Windaus (loc. cit.), and is believed to be epimeric with it in regard to carbon atom 6.

(b) The diacetate, M. P. 138° C., of this cholestanediol-3,6 is obtained by refluxing the diol with an excess of acetic anhydride and recrystallizing the product from methanol. It is believed that this diacetate differs from the diacetate, M. P. 107° C., of Windaus (loc. cit.) in regard to configuration at carbon atom 6.

(c) A solution of 200 g. of cholestanediol-3,6-diacetate, M. P. 138° C. in 8 liters of acetic acid is stirred and maintained at 90° C. while, over a five hour period, a solution of 400 g. of chromic anhydride in 400 cc. of water and 1200 cc. of acetic acid is run in. After an additional four hours of stirring, 300 cc. of methanol is added to destroy the excess chromic acid. The solution is now concentrated in vacuo to a volume of two liters, diluted with water, and extracted with ether. The ethereal extract is washed with dilute hydrochloric acid and water, then 10% aqueous sodium hydroxide is added to the ethereal extract, and the precipitated sodium salts collected and washed with sodium hydroxide solution and ether. The layers in the filtrate are separated, and the ethereal layer washed with water.

(d) The ethereal solution is evaporated to a sirup, and the latter dissolved in 500 cc. of hot alcohol. On cooling, crystals of unchanged cholestanediol-3,6 diacetate separate. These are collected and washed with methanol. On concentrating the mother liquor there may be obtained a small additional quantity of the unreacted diacetate. The total amount of recovered diacetate amounts to about 40 g.

The methanolic mother liquor obtained above is evaporated to dryness, and the syrupy residue steam-distilled to remove steam-volatile ketones. The residual liquor is cooled, extracted with ether, and the ethereal extract evaporated to dryness. The syrupy residue is dissolved in about 400 cc. of methanol, a solution of 15 g. of semi-carbazide acetate in methanol added, and the mixture warmed on a steam bath for two hours. During this time the solution is concentrated to a volume of about 100 cc. The solution is cooled, 1 liter each of ether and water added, and the mixture filtered. The semicarbazone collected on the filter funnel is recrystallized from methanol, M. P. 222° C. The yield amounts to 4 g. It is hydrolyzed by warming for a short time with 10% aqueous alcohol sulfuric acid. The mixture is diluted with water, ether extract, and the ether extract concentrated on the steam bath. The residue is refluxed with 200 cc. of 10% methanolic potassium hydroxide for two hours, cooled, diluted with water, and ether extracted. The ether is evaporated and the residue crystallized from diluted alcohol. It is androstanediol-3($\beta$),6-one-17 of M. P. 205° C.

The mother liquor from the purification of androstanediol-3-($\beta$)6-one-17 diacetate semicarbazone is hydrolyzed with sulfuric acid, and the ketonic fraction isolated as before by ether extraction. The syrup thus obtained is refluxed for 20 minutes with 50 cc. of acetic anhydride, and then the acetic anhydride is distilled away in vacuo. The residue is very slowly distilled in a high vacuum and fractions collected up to 160° C., 160–200° C., and 200–250° C. These fractions on fractional crystallization from diluted alcohol yield androstanediol-3($\beta$),6-one-17 diacetate, allo-pregnanediol-3($\beta$),6-one-20 diacetate, and 3($\beta$),6-diacetoxy-allo-cholanyl methyl ketone respectively.

(e) One gram of 3($\beta$),6-dihydroxy-allo-cholanyl methyl ketone, $C_{26}H_{44}O_3$, obtained as above, is treated with methylmagnesium iodide, acetylated, dehydrated, oxidized and hydrolyzed as in Example 6. The major product, M. P. 275–8° C., is 3($\beta$),6-dihydroxy-allo-cholanic acid identical with the 3($\beta$),6-dihydroxy-allo-cholanic acid from catalytic hydrogenation of $\beta$-dehydrohyodesoxycholic acid.

*Example 9*

(a) A solution of 20 g. of methyl nor-hyodesoxycholate is treated with 16 mols of phenylmagnesium bromide and the product hydrolyzed and ether-extracted as in Example 1. The ether is evaporated and the residue crystallized from toluene, giving the crystalline tertiary carbinol, bis-nor-hyodesoxycholanyl-diphenylcarbinol of melting point 222° C. It may be represented by the following formula:

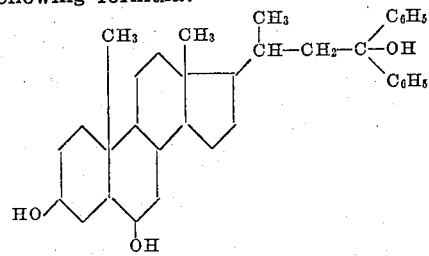

(b) To a solution of 20 g. of the above tertiary carbinol in 200 cc. of pyridine there is added gradually a solution of 20 cc. of benzoyl chloride in 100 cc. of pyridine. After standing overnight at room temperature, the mixture is poured into about 2 liters of a mixture of ice and dilute hydrochloric acid, and the precipitated ester collected, washed, and dried. Then it is dissolved in 400 cc. of acetic acid, heated to 85° C., and, while maintaining this temperature, a solution of 200 g. of calcium permanganate in 200 cc. of 90% acetic acid is run in over a period of forty-five minutes. After heating for three hours more at this temperature, the reaction mixture is cooled, poured into about 2 liters of dilute hydrochloric acid, and the precipitate collected and washed. It is refluxed for 2 hours with 30 g. of potassium hydroxide in 100 cc. of water and 250 cc. of methanol, and then largely diluted and acidified. The precipitated bis-nor-hyodesoxycholic acid is recrystallized from much ethyl acetate and has M. P. 240° C.

I have found that the above examples, illustrative of the invention, are capable of numerous variations in regard to starting materials, reagents, conditions, etc., all of which fall within the scope of my invention.

Thus my invention is not limited to a preferred configuration in regard to carbon atoms 3, 5, or 6, for as suitable starting materials there may be used any of the isomeric 3,6-dihydroxy steroids having a carbonyl-containing substituent at C-17, such as hyodesoxycholic acid or the isomeric 3($\beta$),6-dihydroxy-allo-cholanic acids. The latter may be obtained according to the copending application of Russell Earl Marker, Serial Number 359,162, filed September 30, 1940, and are believed to be epimeric in regard to C-6. Likewise, the substituent at carbon atom 17 may be any substituent containing a carbonyl group, such as the following:

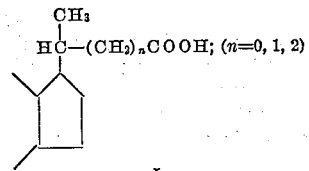

I

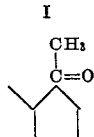

II

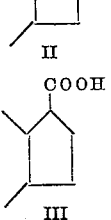

III or other similar groups at C-17, such as ketone, aldehyde, ester, acid chloride, amide, or lactone groups or side chains containing same.

Again, instead of organometallic compounds derived from magnesium or lithium, there may be used organosodium, organo-zinc, or other organometallic compounds derived from metals more electropositive than iron. These may be prepared, for example, by treatment of the metal, such as sodium, potassium, lithium, calcium, barium, magnesium, or zinc, with methyl chloride, brom-benzene, an iodotoluene, a bromonaphthalene, a bromoanisole, etc. Obviously any other aryl halide which contains no substituents readily attacked by metals may be substituted for the halides mentioned above.

In the step of protection against oxidation of the 3- and 6-hydroxyl groups of the tertiary carbinol or ethylene obtained by reaction of the side chain carbonyl group with the organo-metallic compound, there may be used instead of acetic anhydride or benzoyl chloride, other etherifying or acylating agents such as ketene, succinic anhydride, phosphorus oxychloride, methyl sulfate, stearyl chloride, phenylisocyanate, and the like.

If the 3,6-dihydroxy steroid derivative treated with the organometallic compound is a 3,6-dietherified steroid, the ether groups, in contrast to acyloxy groups, are usually not removed by the organometallic compound, and in this case subsequent treatment with an etherifying or acylating agent is not required to protect these groups against oxidation. While the dehydration may occur simultaneously with the acylation, or before or after acylation, it is preferable to dehydrate by refluxing the acylated steroid with acetic acid, which may contain a little water or mineral acid. Other dehydration methods, may, however, be employed, such as high vacuum distillation or heating with p-toluenesulfonic acid, sulfuric acid, or potassium bisulfate, or other acidic dehydrating agents.

The oxidation of the ethylene derivative may be accomplished with chromic acid, or with potassium permanganate, or by means of ozone, or by any other oxidizing agent producing rupture of carbon-to-carbon double bonds with production of a carbonyl-containing compound of lesser carbon content. By way of illustration, use of chromic acid on a compound having at C17 the substituent,

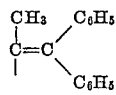

will give according to conditions of time and temperature used, varying amounts of compounds where the groups at C17 are,

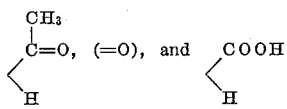

Again, the oxidation may be achieved indirectly, by first hydroxylating the olefine to a glycol with osmic acid, hydrogen peroxide, weak alkaline potassium permanganate solution, or the like, and then subjecting the glycol to oxidative fission with a reagent like lead tetracetate or periodic acid. In many cases, as in Example 9, the acylated tertiary carbinol may be oxidized directly, without preliminary dehydration but it may be assumed that in such cases the tertiary carbinol is dehydrated in situ.

Some of the subject matter shown but not claimed herein is claimed in my copending application, Serial No. 359,162, filed September 30, 1940.

What I claim as my invention is:

1. Compounds of the formula

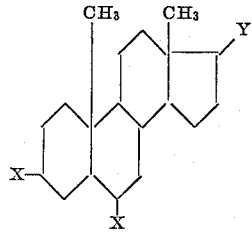

where Y is one of the class consisting of

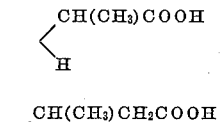

and X is one of the class consisting of: (a) hydroxyl, and (b) ether and ester groups hydrolyzable to hydroxyl.

2. A compound of the formula

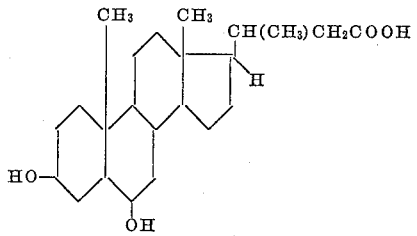

3. A compound of the formula

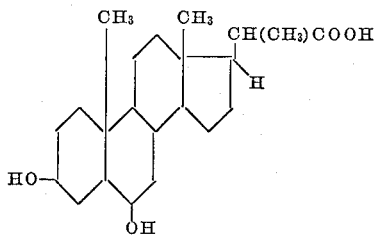

4. Nor-hyodesoxycholic acid, melting at approximately 198° C.

5. Bis-nor-hyodesoxycholic acid, melting at approximately 240° C.

6. 3(β),6-dihydroxy - bis - nor - allo - cholanic acid, melting at approximately 259° C.

RUSSELL EARL MARKER.